United States Patent
Agopian

(10) Patent No.: US 8,390,636 B1
(45) Date of Patent: Mar. 5, 2013

(54) GRAPHICS DISPLAY COORDINATION

(75) Inventor: Mathias Marc Agopian, Moutain View, CA (US)

(73) Assignee: Google Inc., Mountain View, CA (US)

( * ) Notice: Subject to any disclaimer, the term of this patent is extended or adjusted under 35 U.S.C. 154(b) by 1118 days.

(21) Appl. No.: 12/268,192

(22) Filed: Nov. 10, 2008

Related U.S. Application Data

(60) Provisional application No. 60/987,381, filed on Nov. 12, 2007.

(51) Int. Cl.
- G09G 5/36 (2006.01)
- G06F 15/16 (2006.01)
- G06F 15/167 (2006.01)
- G06F 12/00 (2006.01)
- G06F 13/00 (2006.01)

(52) U.S. Cl. ........ 345/545; 345/502; 345/530; 345/541; 711/130; 711/147

(58) Field of Classification Search .................. None
See application file for complete search history.

(56) References Cited

U.S. PATENT DOCUMENTS

| | | | |
|---|---|---|---|
| 5,046,023 A | 9/1991 | Katsura et al. | |
| 5,402,147 A | 3/1995 | Chen et al. | |
| 5,754,191 A | 5/1998 | Mills et al. | |
| 6,067,608 A * | 5/2000 | Perry | 711/203 |
| 6,452,601 B1 | 9/2002 | Marino et al. | |
| 6,927,776 B2 | 8/2005 | Mino et al. | |
| 7,126,608 B2 | 10/2006 | Alben et al. | |
| RE41,565 E | 8/2010 | Fielder et al. | |
| 2005/0268092 A1* | 12/2005 | Shankar et al. | 713/164 |
| 2006/0064546 A1* | 3/2006 | Arita et al. | 711/130 |
| 2007/0120820 A1* | 5/2007 | Holzinger et al. | 345/156 |
| 2008/0266302 A1* | 10/2008 | Andre et al. | 345/519 |
| 2011/0169848 A1 | 7/2011 | Bratt et al. | |

* cited by examiner

*Primary Examiner* — Tize Ma
(74) *Attorney, Agent, or Firm* — Fish & Richardson P.C.

(57) ABSTRACT

The subject matter of this specification can be embodied in, among other things, a method that includes computer-implemented graphics frame buffer process that establishes on a computing device a graphics frame buffer accessible to be written by an application process and to be read by a graphics server process. The method further comprises generating a token whose value or values control access to the frame buffer by the application process and the graphics server process and reading frames from the frame buffer using the value or values in the token.

19 Claims, 10 Drawing Sheets

GRAPHICS DISPLAY COORDINATION

CROSS-REFERENCE TO RELATED APPLICATIONS

This application claims priority from U.S. Provisional Application Ser. No. 60/987,381 filed Nov. 12, 2007, and entitled "Graphics Display Coordination," the contents of which are incorporated herein by reference.

TECHNICAL FIELD

This instant specification relates to operation of frame buffers and similar apparatuses.

BACKGROUND

As computers become more powerful, users demand better visual performance from their computers. A black screen with green text will not suffice anymore for most people. Rather, color graphics with animation and video is now the norm on desktop computers. Such impressive graphics displays are often rendered by dedicated graphics cards with high-speed graphics processing units (GPUs) or other powerful processors programmed to crunch the data needed to produce beautiful, fast-changing displays.

As people use their cellular telephones and other mobile devices for more activities, such as web surfing, local search, and watching of videos, those smaller devices need to provide better graphics capability. Yet graphics processing traditionally require space and electrical power—both of which are anathema to mobile, battery-operated devices. One part of graphics processing that can require processing power is communications and coordination between applications seeking to place content on a device's display and a graphics processor or server that is responsible for generating the display.

SUMMARY

This document describes systems and techniques that may be used to manage the rendering of graphical content on a computing device, such as a mobile smartphone or personal digital assistant. In general, and in certain implementations, inter-process communications may be largely avoided by using a token, or small area of memory holding state variables, to coordinate actions between a computer application wishing to draw to a device display, and a graphics processor or server tasked with managing such drawing to the display.

The application process and a graphics process may both look to the token for cues regarding the status of a frame buffer, and may also write to the token to change its statuses. For example, the token may contain a bit that is written by the application process to indicate that a frame is ready, and that can be cleared by the graphics process when the frame is read. Also, the token may contain a bit that indicates which buffer an application should write to (i.e., where the frame buffer has multiple buffers), and the graphics process may flip that bit after it has read from a particular buffer. Various other mechanisms may also be used to minimize the need for high-overhead processes such as inter-process communication used for frame coordination, in the frame passing process.

In certain implementations, such systems and technique may provide one or more advantages. For example, using a token rather than inter-process communications or other similar mechanisms to coordinate frame passing may lower the overhead required for such activities. As a result, additional graphics processing power may be freed up for other actions, which may improve the speed of a processor, improve the resolution or color depth of the displayed graphics, lower the speed required of the graphics processor, lower the power required for generating graphics, and lower the heat generated by such processing.

In one implementation, a computer-implemented graphics frame buffer process is disclosed. The process comprises a computer-implemented graphics frame buffer process that establishes, on a computing device, a graphics frame buffer accessible to be written by an application process and to be read by a graphics server process. The process further comprises generating a token whose value or values control access to the frame buffer by the application process and the graphics server process and reading frames from the frame buffer using the value or values in the token.

In a second general aspect, a tangible recordable media has recorded and stored thereon instructions, that when executed, perform establishes on a computing device a graphics frame buffer accessible to be written by an application process and to be read by a graphics server process. The tangible recordable media having recorded and stored instructions further comprises generating a token whose value or values control access to the frame buffer by the application process and the graphics server process; read frames from the frame buffer using the value or values in the token.

In a third general aspect, a computer graphics processing system comprises a graphics processor to operate a graphics display process and a a graphics frame buffer accessible by an application process and the graphics display process. The system further comprises a token associated with the graphics frame buffer presenting a state of the graphics frame buffer to the graphics processor and one or more application processes.

The details of one or more embodiments of the graphics management features are set forth in the accompanying drawings and the description below. Other features and advantages of the graphics management features will be apparent from the description and drawings, and from the claims.

DESCRIPTION OF DRAWINGS

Like reference symbols in the various drawings indicate like elements.

DETAILED DESCRIPTION

This document describes systems and techniques for coordinating the display of graphics data on a computing device.

In an illustrative implementation, graphics applications may share access to a frame buffer with a graphics server by setting and clearing bits in an area of shared memory. For example, a graphics application may generate image data that represents a three-dimensional image and store the data in a frame buffer associated with the application. When notified that such data has been stored (or periodically without notification), a graphics server may read the data from the buffer and display the image on the screen of a computing device.

Access to the buffer may be controlled by setting and clearing bits of memory in a segment of shared memory. Each bit may represent status information related to buffer; e.g., whether an application may access the buffer, which part of the buffer is available for processing, etc. By setting and clearing bits in shared memory in an appropriate manner, the graphics applications and the graphics server may share access to a frame buffer without engaging in direct communication and active synchronization.

Figure 1:
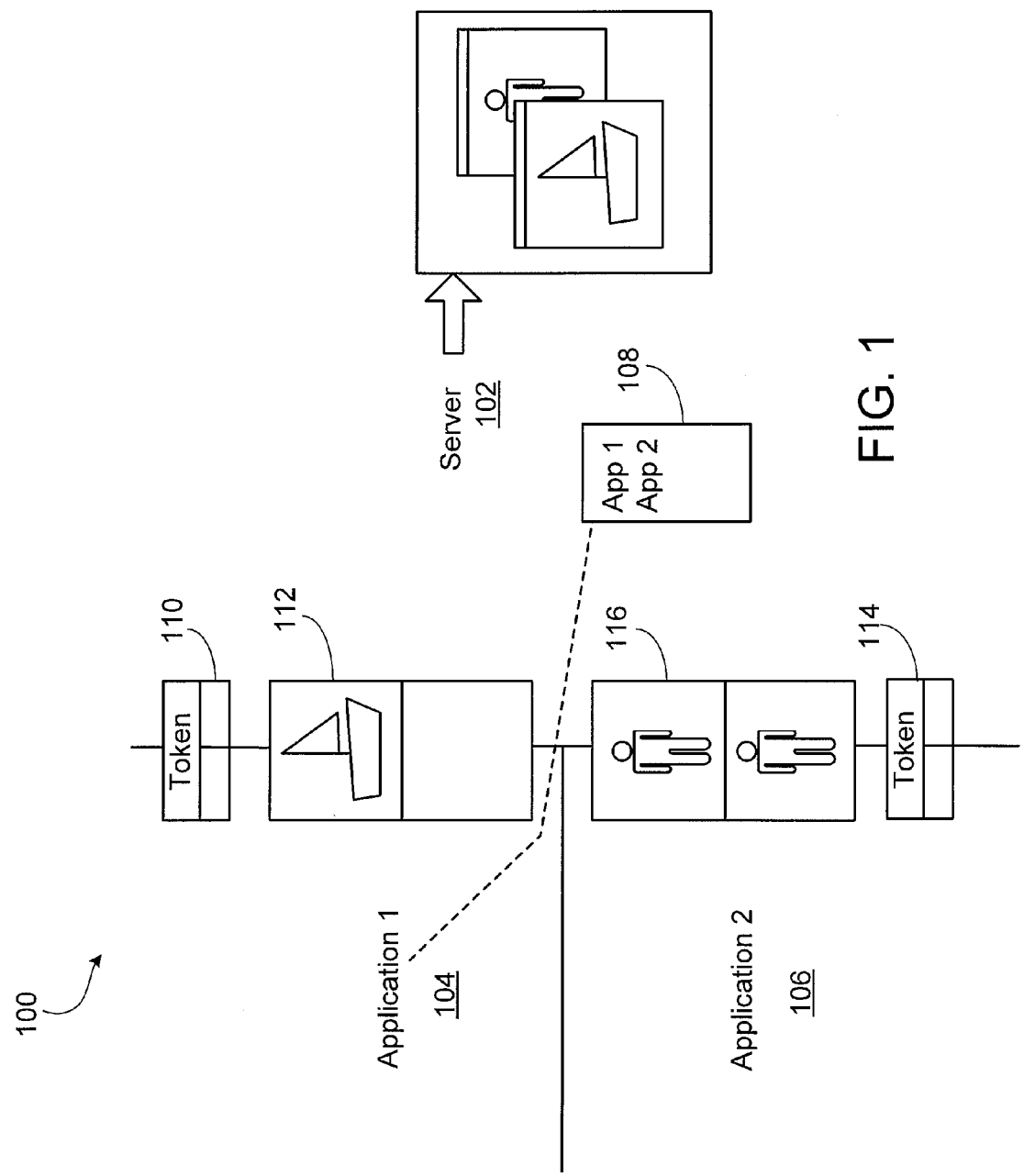
FIG. 1 is a conceptual diagram of an exemplary graphics coordination display system in a computing device.

FIG. 1 is a conceptual diagram of an exemplary graphics coordination display system 100 in a computing device. In one implementation, the system 100 includes one or more graphics servers 102, and graphic applications 104, 106, a work list 108 (also referred to as an access priority list), shared memory 110, 114, and frame buffers 112, 116.

The graphics applications 104, 106 generally include application programs running on the system, such as business applications, mapping applications, or other programs that need to communicate with a user through a graphical user interface (GUI). The display of such information in the GUI is not performed directly by the graphics applications 104, 106, but is instead performed by the graphics server 102, which may include one or more processes running on a microprocessor or graphical processing unit (GPU). In general, display of information associated with applications that a device is running occurs by the applications 104, 106 passing images to the graphics server 102 through the frame buffers 112, 116, and through cooperation of the applications 104, 106 and the graphics server 102, as is explained more fully here.

The graphics applications 104, 106 can generate a series of three-dimensional images or other graphics information for storage in the frame buffers 112, 116. For example, applications 104,106 may determine the viewpoint from which a imaginary "camera" may observe the image frame being created. After determining the viewpoint, applications 104, 106 may generate geometric primitives such as triangles and polygons or more advanced objects such as surfaces to represent three-dimensional objects in the frame.

Each application 104, 106 may have a frame buffer 112, 116 associated with it. Frame buffers 112, 116 can be areas of memory reserved for writing image data for a frame created by applications 104, 106. The memory may be shared as between a particular application and the graphics server 102, but each application's frame buffer may be protected from access by any other application.

The image data provided by the applications 104, 106, can be read from the buffers 112, 116 by the server 102, which may display the data on the computing device's screen. In certain implementations, the frame buffers 112, 116 are divided into two sections or buffers: a front buffer and a back buffer. Each section of the buffer may be accessed in a mutually exclusive fashion by the server 102 and the application 104, 106 associated with the frame buffer 112, 116. Access to the frame buffer 112, 116 may be controlled by setting bits in shared memory 110, 114 (also referred to as a token), as explained in more detail below.

In addition to frame buffers 112, 116, applications 104,106 may also have access to one or more tokens 110, 114, which are simply indicators that can be read and/or written by the server 102 and the respective application to coordinate access to the frame buffers 112, 116.

As data is written to and read from a frame buffer 112, 116, bits in tokens 110, 114 may be set and cleared by the applications 104, 106 and server 102 to indicate which sections of the buffers 112, 116, can and/or should be written to or read from. For example, one or more bits may indicate whether the particular frame buffer 112 or 116 is currently being processed by the server 102; which buffer within the frame buffer 112 or 116 is available for use by the associated application 104, 106, and whether the relevant buffer 112 or 116 needs to be serviced by the server 102, among other information related to the status of the buffers.

Generally, tokens 110, 114 and frame buffers 112, 116 are implemented in partially shared memory—memory that is shared between the server 102 and a particular application (or perhaps a group of applications), but that is not shared with other applications. In some implementations, tokens 110, 114 may be implemented in a frame buffer 112, 116. For instance, one or more bits of the buffer 112, 116 may be set aside to control access to the buffer 112, 116. In an illustrative example, tokens 110, 114 may be implemented as either two or four bits of the frame buffer; however, other implementations may involve additional (or, in some cases, fewer) bits.

Work list 108 is used by server 102 to control which frame buffer is next accessed. Work list 108 may include a list of applications 104, 106 whose associated frame buffers 112, 116 are awaiting processing by the server 102. In some circumstances, an application 104, 106 may send a signal to the work list 108 indicating that the application's frame buffer 112, 116 has data ready for processing by the server; in response to the signal, work list 108 may add the address of the application's frame buffer 114, 116 to the list 108 for future processing by the server. The server 102 may periodically check the work list 108 and, in response, may process data contained in the applications' 104, 106 frame buffers 112, 116 in the order the buffers 112, 116 are presented in the list 108.

In other implementations, the server 102 may process the buffers 112, 116 designated in the work list 108 according to a criteria other than when the buffer 112, 116 was added to the list; e.g., certain buffers 112, 116 may be flagged in the list 108 for expedited processing, the list 108 may be sorted based on the amount of data stored in the buffers 112, 116, etc. Also, even when applications 104, 106 report availability of frames to the list 108, the report may be more of a "soft" report than a command, in that the list 108 may show all currently registered and operating applications, and server 102 may use the list simply as a mechanism to cycle through the buffers 112, 116 each time it wakes up (e.g., 30 or 60 times each second).

Server 102 can manipulate the geometric primitives and surfaces created by the applications 104, 106 to create a cohesive scene and display the resulting frame on the screen of a computing device such as a personal digital assistant, cellular telephone, personal computer, or other appropriate computing device. In some situations, server 102 is implemented as a surface manager 821; see FIG. 8 and the accompanying description for a detailed discussion of the surface manager 821 and its functions.

In an illustrative implementation, the server 102 may read the image data created and stored in the frame buffers 112, 116 by the applications 104, 106 when an appropriate bit in shared memory 110, 114 is set, or in response to information contained in the work list 108.

The server 102 may subsequently convert the objects stored in the buffers 112, 116 from their own coordinate system (i.e., "model space") to a coordinate system suitable for additional processing. For example, the server 102 may first transform the objects from model space to "world space," i.e., the scene's coordinate system. In addition to (or often in lieu of) the transformation from model to world space, the server 102 can transform the objects into "view space," the coordinate system of the camera. Once the objects have been transformed into view space, further manipulations may occur.

In some circumstances, the server 102 may determine which objects are visible in the scene by, for example, calculating which objects, if any, are within the viewing frustum of the camera; objects outside the frustum are excluded from further processing. In addition, the server 102 may remove objects in the scene that are blocked (i.e., occluded) by objects in the foreground of the scene. Further object exclusion may occur when the objects are converted from view space into "clipping space," i.e., where the coordinates of the three-dimensional objects are normalized into a specified range, e.g., x and y coordinates between −1 and 1 and z coordinates between 0 and 1. Sections of scene objects that reside partially outside the clip space are removed from the scene. When the server 102 has determined which objects are part of the scene, the server 102 may perform additional processing (lighting, texture mapping, etc.) before displaying the objects on the screen of the device.

Other operations may also be performed by the server 102 in combining information from multiple applications for presentation on a computer display. For example, where different applications are competing for screen real estate, the server 102 may determine which data from each application 104, 106 to display and may combine the provided data into one composite presentation.

After the server 102 has processed a frame buffer 112, 116, the server 102 may indicate that the frame buffer 112, 116 is available for use by the application 104, 106 by, for example, setting and clearing the appropriate bits in token 110 or 114. In some implementations, each application 104, 106 may have a server 102 responsible for drawing the images saved in the frame buffer 112, 116 to the display screen. For example, each application 104, 106 may have portions of one or more objects or surfaces to be displayed on the computing device. After the application 104, 106 has written its portion of the image data to the application's 104, 106 frame buffer 112, 116, the server 102 assigned to the application 104, 106 may draw the data stored in the buffer 112, 116 to the appropriate area of the display.

In an illustrative example, the system 100 may prepare to draw an image by instantiating one or more applications 104, 106 and servers 102. Upon receiving a request from an application 104, 106, the server 102 may allocate an area in memory for each application 104, 106 to store the image data it creates; i.e., the server may create a frame buffer 112 or 116 for each application 104, 106.

Before an application 104, 106 attempts to store image data in its frame buffer 112, 116, the application 104, 106 may check the state of control bits in token 110, 114. For example, one or more of the control bits may indicate that both sections of (or buffers in) the frame buffer 112, 116 are free and that the application 104, 106 may write to the frame buffer 112, 116. If this is the case, the application 104, 106 may, in some implementations, write its image data to the front section of the buffer 112, 116; subsequently, the application 104, 106 may set one or more bits indicating that the front section of the buffer 112, 116 is no longer free and requesting that the server 102 process that section of the buffer 112, 116.

If the application 104, 106 attempts to write to the frame buffer 112, 116 before the server 102 has serviced the front segment of the buffer 112, 116, the state of the control bits will indicate that the application 104, 106 should write data to the back of the buffer. After writing to the back portion of the buffer 112, 116, the application 104, 106 may, in some implementations, set a control bit indicating that buffers are full. If this bit is set, the application 104, 106 will be forced to wait for the server 102 to process the stored data before the application 104, 106 can write additional data to a segment of the buffer 112, 116

Once server 102 is aware that a buffer 112, 116 is ready to be processed, the server 102 can access the appropriate section of the buffer 112, 116 and draw its contents on the display screen of an output device such as cellular telephone. In some implementations, the server periodically checks the work list 108 to determine whether any buffers 112, 116 have data that should be displayed. Alternatively, the server 102 may use the control list 108 to cycle through the frame buffers regardless of whether data is ready for display, and may check the appropriate control bits for each application 104, 106 to determine if data for that particular application is ready for display. The control bits may also be integrated with the control list 108.

For example, in addition to (or instead of) setting a control bit in shared memory 110, 114, an application 104, 106 may submit a processing request to the work list 108. In some cases, the request may contain the frame buffer's handle 112, 114; in other implementations, the request may contain additional information such as which buffer 112, 116 section contains data, the priority of the request, or other pertinent information. The server 102 may process the requests in the list 108 in either ascending or descending order, or may process the requests according to other criteria such as the, amount of data contained in the buffer, whether the image data contained in the buffer is in the foreground of the display, whether the image data is dynamic (i.e., moving), etc.

In some situations, the server 102 may read a control bit in token 110, 114 to determine whether any data needs processing. For example, one or more of the bits may indicate a processing request by an application 104, 106. When the bit is set, it indicates to the server 102 that data is awaiting processing and the server 102 may respond by displaying the data on an output device such as a screen. The server 102 may also check another bit that may indicate which section of the buffer is to be processed next (i.e., a bit that may be flipped by the server 102 each time it finishes reading from the particular frame buffer).

While the server 102 is processing a buffer segment, the server 102 may set one or more control bits to indicate that the server 102 is processing data contained in the buffer. If these bits are set, an application 104, 106 may not be allowed to write data to the section being processed by the server. Once the server 102 has finished processing, the server may clear (i.e., zero) the aforementioned control bit (or bits), indicating that an application 104, 106 may write data to the buffer. In addition, and as noted, the server 102 may flip one or more bits that indicates which segment of the buffer 112, 116 is available for write operations by the server. After the control bits are reset, the process can be repeated. Further descriptions of processing by servers such as server 102 are provided below with respect to FIGS. 3-6.

Figure 2:
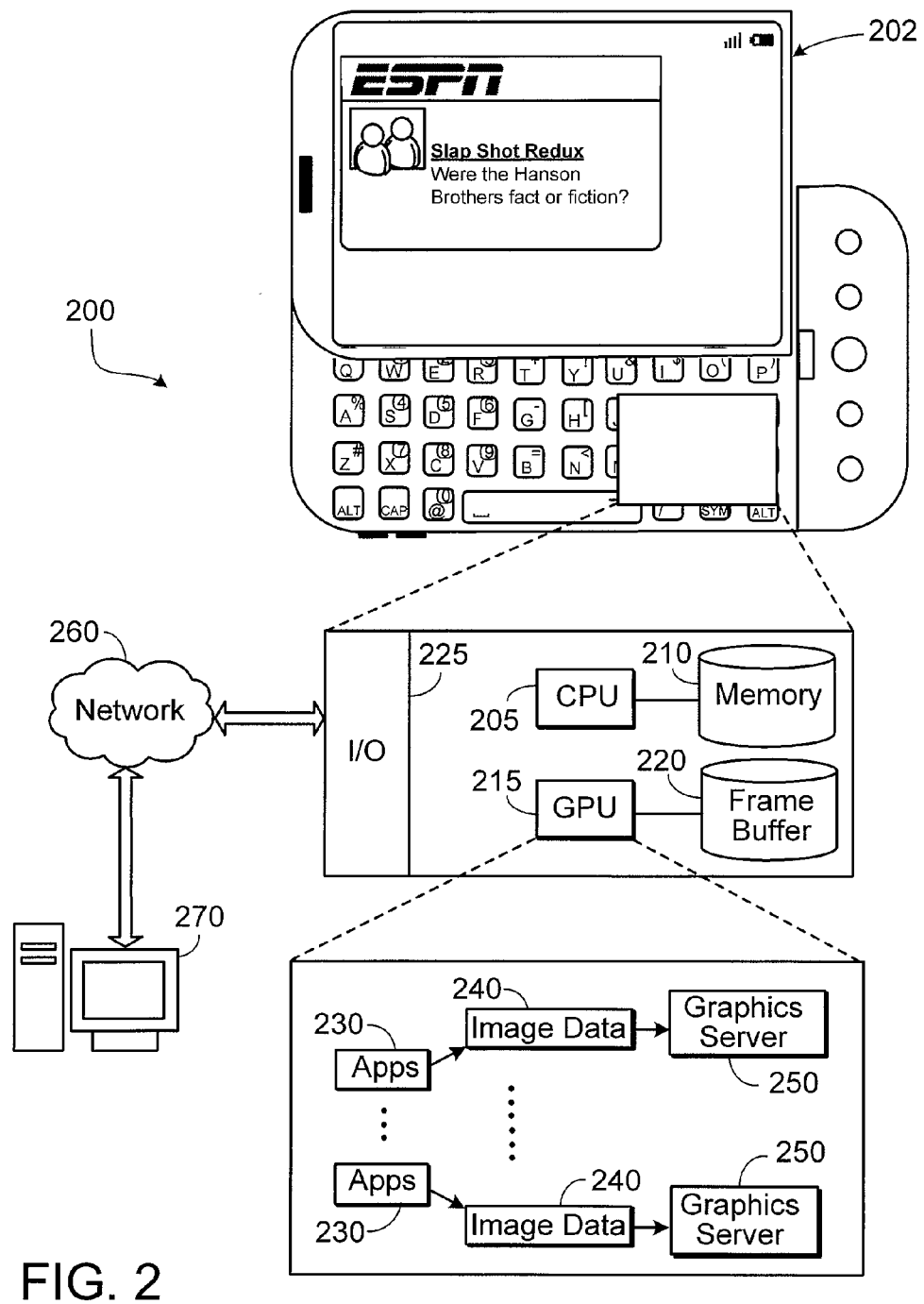
FIG. 2 is a block diagram of an illustrative graphics coordination system.

FIG. 2 is a block diagram of an illustrative graphics coordination system 200. A computing device 202 that is configured to display information through a graphical user interface (GUI) may include a central processing unit 205, frame buffer storage 220, memory 210, graphics processing unit (GPU) 215, and input/output interface 225. In some implementations, the GPU may be a standalone processor running graphics-related processes or may be part of another processor such as the central processing unit on the device, such as an ARM processor.

The device 202 may communicate with a remote computing device 270 via a network 260 such as the Internet. Such communication may occur, for example, wirelessly via a cellular network, WiFi, WiMAX, or similar mechanism.

In operation, application code may be stored in a persistent area of memory 210 (e.g., disk drive or Flash memory) and accessed by CPU 205 when an application is launched or while the application is running. As the user interacts with an application, additional data may be formed by the application and stored in persistent or non-persistent (e.g., RAM) areas of memory 210, in various well-known manners. Also, the CPU 205 may cause communication to occur over an interface to the network 260, such as through HTTP requests and responses, or other similar mechanisms.

As the applications generate information to be viewed by the user, they may provide such information to the GPU 215 for final processing before it is provided to a display on the device 202, using the techniques described here.

The GPU can run one or more graphics applications 230 that can produce image data 240. Alternatively, the applications 230 may run on CPU 205. In addition, the GPU may also run one more graphics servers 250 to perform various operations on the image data created by the applications 230 such as lighting, culling, texture mapping, etc. In an illustrative example, once a program requiring three-dimensional graphics is executed on the device 202, one or more graphics applications 230 and graphics servers 250 may be created in response. After the servers 250 and applications 230 have been created, the servers 250 may provide each application 230 with access to a section of the frame buffer storage 220. Each application may store image data created by the application in its associated area of the frame buffer storage 220. Subsequently, one or more graphics servers 250 may process the image data by, for example, performing lighting, culling, texture-mapping or MIP-mapping, shading, or other operations on the image data. Once the image data has been processed, the image data may be displayed on the device's 202 display screen.

Figure 3:
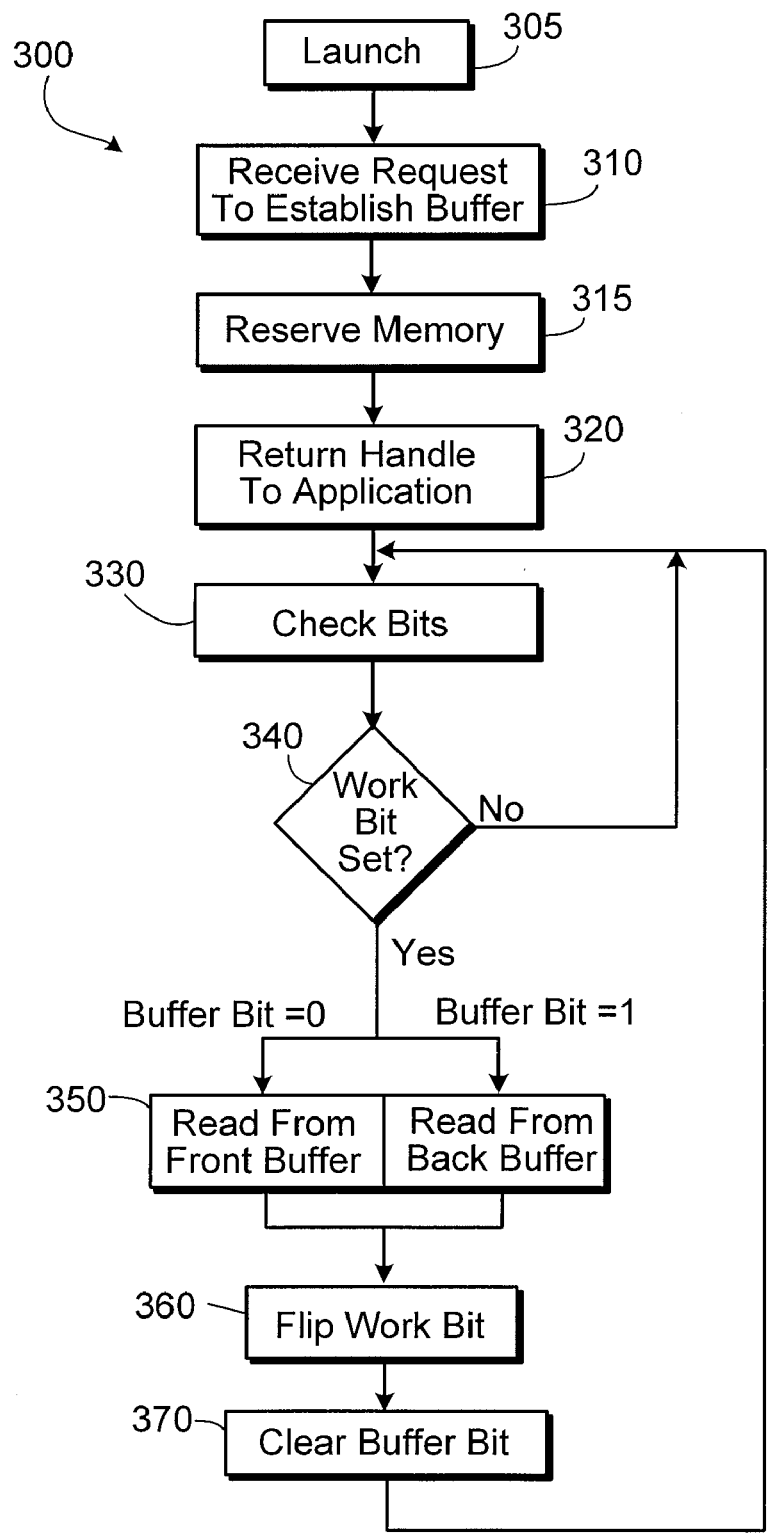
FIGS. 3 and 4 are flow charts of example processes for coordinating a graphics display system on a computing device.
Figure 4:
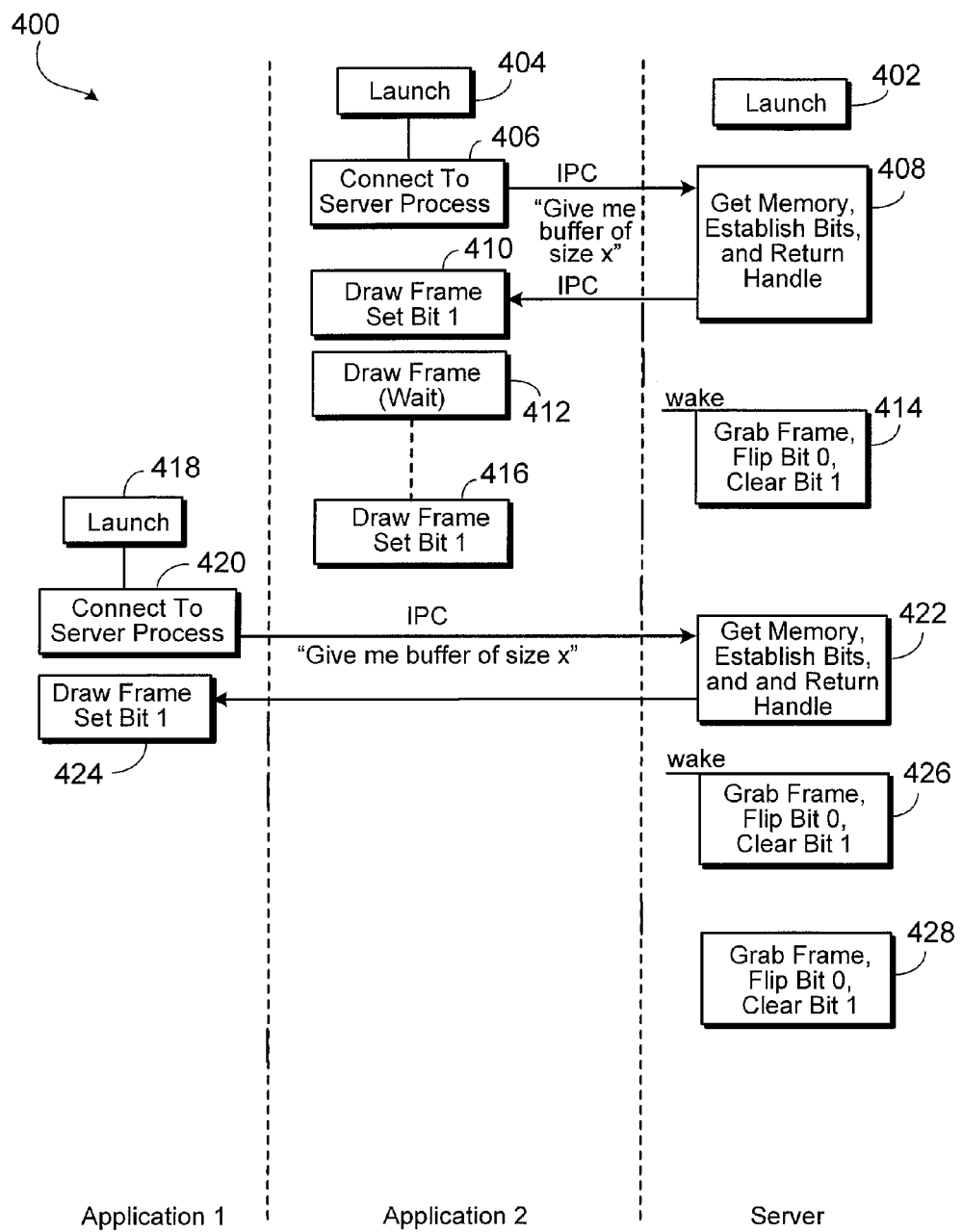

FIGS. 3 and 4 are flow charts of example processes 300 and 400 for coordinating a graphics display system on a computing device. The processes 300 and 400 may be performed, for example, by a system such as system 200 and, for clarity of presentation, the description that follows uses the system 200 and conceptual diagram 100 as the basis of an example for describing the processes. However, another system, or combination of systems, may be used to perform the processes 300 and 400.

Referring to FIG. 3, the process 300 begins at step 305 when applications 104, 106 are launched (and server 102 may have been previously launched). Applications 104, 106 and server 102 may be launched when a device attempts to generate a three-dimensional or other graphical display. For example, a cellular telephone user may select a three-dimensional video game by selecting an icon that represents the program in the device's graphical user interface. In response, the device's operating system may launch one or more applications 104, 106 and server 102 or servers to generate the three dimensional objects required by the game.

After the applications 104, 106 and server 102 have been launched, the method proceeds to step 310 where a request is received to establish a frame buffer 112, 116. In some instances, once an application 104, 106 has been created, it may send a request to a server 102 to create a frame buffer 112, 116 for the application 104, 106. For example, the application 104, 106 may contact the server 102 via a communication channel (e.g., using inter-process communications, or IPC) and ask the server 102 to generate a frame buffer 112, 116 containing a specific number of bits. In response, the server 102 may reserve memory for the frame buffer 112, 116, including control bits in a token, at step 315. For example, the server 102 may reserve the amount of memory specified by the application 104, 106 and also reserve a segment of memory to act as a token for coordination purposes. In an alternative implementation, the server 102 may dynamically determine the size of the buffer 112, 116, or the buffer 112, 116 size may be predetermined. In some situations, the token may be implemented in the frame buffer 112, 116.

After the memory has been reserved, the server 102 may return a handle to the application 104, 106, at step 320. For instance, the server 102 may return the address (i.e., the handle) of the memory it allocated for the application's 104, 106 buffer 112, 116 to the application 104, 106 by means of the communication channel.

At step 330, before the server 102 attempts to read data from a frame buffer 112, 116, the server 102 checks the status of control bits in the token associated with the frame buffer 112, 116, to determine whether the data is ready for processing and, if so, which section of the buffer 112, 116 needs processing. In an illustrative implementation, two control bits may reside in shared memory. One bit may alert the server 102 that there is information in a section of the buffer 112 or 116 waiting to be processed (the "work" bit); the other bit may indicate which section or segment of the buffer 112, 116 is free to accept image data from an application 104, 106 (the "buffer" bit). When the work bit is one, there is data in the buffer 112, 116 for the server 102 to process and the application may not write to the buffer 112, 116; if the bit is zero, the buffer 112, 116 is empty and free for use by the application. Similarly, if the buffer bit is zero, the front segment of the buffer 112, 116 is available for processing; if the buffer bit is one, the back segment of the buffer 112, 116 may be used by the application to store image data. However, unlike the work bit, only the server 102 may change the value of the buffer bit in this example.

Before the server 102 attempts to read data from the buffer 112, 116, the server 102 checks the status of both the work bit and the buffer bit at steps 340 and 350 to determine which buffer 112, 116 contains data ready for processing. As noted above, if the work bit is one, the buffer 112, 116 contains data that can be processed by the server 102. At step 340, the server 102 checks the work bit; if it is set, the method may proceed to step 350. Assuming that the work bit is set (i.e., the bit is one), the server 102 will check the status of the buffer bit to determine which buffer 112, 116 to read from as will be explained in reference to step 350 next.

At step 350, the server 102 reads from either the front or back segment of the frame buffer 112, 116 depending on the state of the buffer bit. If the buffer bit is set (i.e., the bit is one), the server 102 reads data from the back section of the frame buffer 112, 116; if not, the server 102 reads data from the front segment. As the server 102 reads data from the appropriate part of the buffer 112, 116, it displays the data on the screen of the computing device. After the server 102 has finished reading data from the buffer 112, 116, it may flip the work bit at step 360 and clear the buffer bit at step 370; subsequently, the method returns to step 330 where the server 102 polls the work bit to determine if any data is ready for display.

This method may occur repeatedly while a server 102 is active. The repetition may occur as applications write to the frame buffer, or as the server periodically "wakes up" to determine if there is work for it to do.

FIG. 4 is a flow chart of example process 400 for coordinating a graphics display system on a computing device. The method begins at steps 402 and 404 where one or more applications and servers are created, or instantiated. As discussed above, one or more servers and applications may be created by a program that may generate three-dimensional or other images. After the application and server have been created, the application may connect to the server and request a frame buffer at step 406.

In response, at step 408 the server may create a frame buffer for the application by reserving a section of memory for the application and, in some implementations, a separate section of shared memory to control access to the buffer (e.g., a token). In some implementations, the server may reserve one or more bits of the frame buffer to control access to the buffer. In this example, the server may create a piece of shared memory that consists of two bits. Subsequently, the server may clear both the shared memory and the frame buffer and return the addresses of the memory locations to the application. Other forms of tokens, which may use more or fewer bits may also be implemented, and frame buffers that operate by mechanisms other than bits may also be employed.

Once the application has received the frame buffer's handle, the application may write data into the frame buffer at step 410. In an illustrative example, as discussed above, the application may check one of the control bits, e.g., bit one (known as the work bit) to determine if the application can write data into the buffer. If the bit is one, there is data in the buffer waiting to be displayed and the application cannot write to the buffer; if the bit is zero, the application may write data into the buffer. Because the server cleared shared memory when it was allocated, the work bit is initially zero, thus the application may write image data into the buffer.

To determine which segment of the frame buffer the application may write to, the application checks the second bit, e.g., bit zero, known as the buffer bit. When the buffer bit contains a zero, the front segment of the buffer is available to store image data; when the buffer bit contains a one, the back segment of the buffer may be used to store image data. But, as noted above, only the server may alter the status of the buffer bit in this example. Like the work bit, the buffer bit is initially set to zero, so the application can write to the front buffer. Once the application has written data into the buffer, the application may set the work bit to one.

After the application has written data to the buffer, the application cannot write to the buffer unless the server has processed the data placed in the buffer. Thus, the method proceeds to the step 412 where the application waits for the server to process the buffer. The server may be alerted to the presence of data in the buffer by, as noted above, checking either the task list or the work bit.

In the illustrative example, once the server detects that the work bit has been set to one, at step 414 the server may access the buffer and display its contents on the screen of the computing device. After the buffer has finished processing the buffer at step 414, the server may flip the buffer bit (here, setting the buffer bit to one) and clear the work bit. Once the server has displayed the contents of the buffer, the application may again write data to the buffer; after the application has finished writing data to the buffer, the application may again set the work bit at step 416

The process described above may be repeated with the same server and another application, and such process may be interleaved with subsequent such processes with the initial application. As shown in the figure, at step 418, a second application is launched as described above; afterwards, the second application may connect to the server and request a frame buffer at step 420. In response, the server may again allocate memory for a frame buffer and shared memory and return the handle of the memory to the second application at step 422. As described above in steps 410-414, the second application and server may write and read data from the buffer in a similar fashion using the control bits in shared memory in steps 424-428.

Figure 5:
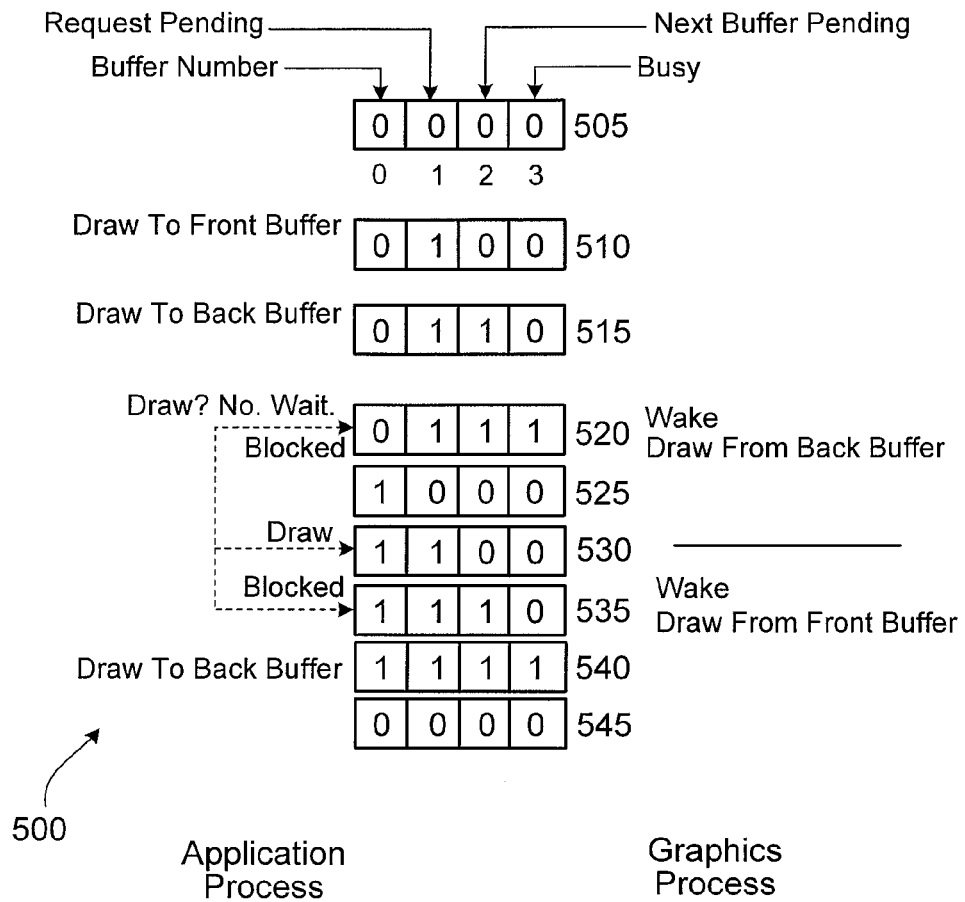
FIG. 5 illustrates a state diagram of a graphics coordination display system on a computing device.

FIG. 5 illustrates a state diagram 500 of a graphics coordination display system on a computing device. In general, the figure shows an application process and a graphics process on each side of a token that can be read and written by the application process and the graphics process in order to coordinate passing of data through a frame buffer without requiring inter-process communication (except perhaps in initially setting up the system or in providing ancillary lower bandwidth support functions to the main frame passing process).

The token is represented by a four bit segment of memory in which each bit that relates to the status of a frame buffer associated with the token. The "buffer number" bit indicates which segment of the buffer to use. The "request pending" bit acts as a flag to indicate that there is work available for the server; if the bit is "on" (i.e., set to one) a buffer section contains image data that the server can process. The "next buffer pending" indicates whether both buffers have been used, while the "busy" buffer bit indicates that the buffer is being processed by the server. Only the server may alter the state of the buffer number bit in this example, to prevent conflicts in the process. In an illustrative example, at state 505, the token is initially clear, i.e., all the bits in shared memory are set to zero. The token may have been initially established in this state, or multiple writes to and reads from the frame buffer may have left the token in such a state.

When an application attempts to write to the buffer, the application checks the state of the request pending bit to see whether there is any work available for the server. Because in the illustrative example the request pending buffer is set to zero, the application may write to a segment of the buffer; subsequently, the application checks the buffer number bit to determine which buffer segment is available. Like the request pending buffer, the buffer number is also initially zeroed, indicating that the application may write to the front buffer, which, in this example, the application does. After writing the image frame to the front buffer, the application sets the request pending bit to one, leaving the token in the state shown at state 510.

The application may attempt to write another image frame to the frame buffer (while the server does not yet act on the buffer). As before, the application checks the status of the request pending buffer. Here (at state 510), the request pending bit is set to one; thus the application checks the busy bit; here, the busy bit is still zero because the server is not currently accessing the buffer. The status of the bits at state 510—request pending set to one, while buffer number is zero—indicates that data has been stored in the front buffer, thus the application will write data into the back buffer. Once the application has finished writing data, the application sets the next buffer pending bit to one as illustrated at state 515.

Optionally, the application may send a message to the server process either directly or indirectly. For example, the application process may send a message to an activity list that is monitored by the server process when the server process is active. Alternatively, the application may send a message that wakes the server process up so that it checks the token and reads the data out of the buffer.

The process described above is repeated if the application attempts to write a third image to the buffer. The application first checks the state of the request pending bit and, because the request pending bit is set to one, the application subsequently checks the state of the next buffer pending bit, which shows that both buffers have been filled.

About the same time, the server wakes up and becomes directed to the token. In the illustrative example, the server may begin to process buffer data as it periodically polls either a work list or various tokens (or, in some implementations, both) associated with currently-active applications, the server may become aware that data in a buffer is waiting to be processed. For example, the server may scan tokens for a set request pending bit. Once a set request pending bit is located, the server checks both the buffer number and request pending bits of the associated token to determine which buffer section contains the most recent data. In the illustrative example, the buffer number and request pending are zero and one, respectively, as indicated by state 515.

Because the buffer number bit is zero while the request pending bit is one, the server is aware that the back buffer contains the most recently stored image data, as only the server can change the state of the buffer number bit. In other words, because the buffer number is still zero and a buffer segment contains data (as indicated by the request pending bit being set to one), the back buffer must contain the most recent image data because, in the illustrative example, the application writes to the front buffer first when the buffer number is set to zero.

As illustrated in state 520, while the server reads data from the back buffer it sets the busy bit to one to prevent an application from accessing the buffer while the servers is reading data from the buffer. After the server has completed reading data from the buffer, it sets the next buffer pending bit to zero, flips the state of the buffer number bit (here, the buffer number would now be set to one), and clears the busy bit and request pending bit as illustrated in state 525.

Once the busy bit is reset to the zero, the application can once again write image data to the buffer. In the illustrative example, the application once again begins the process of writing image data to the frame buffer by examining the state of the request pending bit. As illustrated by state 525, the request pending bit is zero, so the application proceeds to look at the buffer number bit. Because the buffer number bit has been set to one, the application begins writing data into the back buffer. After writing the image to the back buffer, the application sets the request pending bit to one to produce the bit configuration shown in state 530.

The application may repeat the process described above to write another frame to the front buffer. Again, the application first checks the state of the request pending bit; as the bit has been set to one, the application proceeds to look at the busy bit, which in the illustrative example has been cleared. After checking both the request pending and busy bits, the application proceeds to check the buffer number bit. Here, the buffer number bit, like the request pending bit, has been set to one, thus the front buffer is not available for data storage. The application sets the next buffer pending bit to one as illustrated in state 535.

As noted above, once the next buffer pending bit is set, the application may be barred from writing data to the frame buffer until the server processes the buffer. When the server begins to process the buffer, the server sets the busy bit to one. The server than considers the state of buffer number and request pending bits to determine which segment of the buffer contains the most recently stored image data. In the illustrative example, the front buffer contains the most recent data—because both the buffer number and request pending bits are one, the application would have written to the back buffer first—so the server begins to read data from the front buffer. While the server is processing the data, it sets the busy bit to one as illustrated in state 540.

Once the server has processed the image data, the server resets the busy bit and next buffer pending bits to zero. In addition, the server also flips the buffer number bit (which, in this example, sets the buffer number to zero) and zeros the request pending bit.

Figure 6:
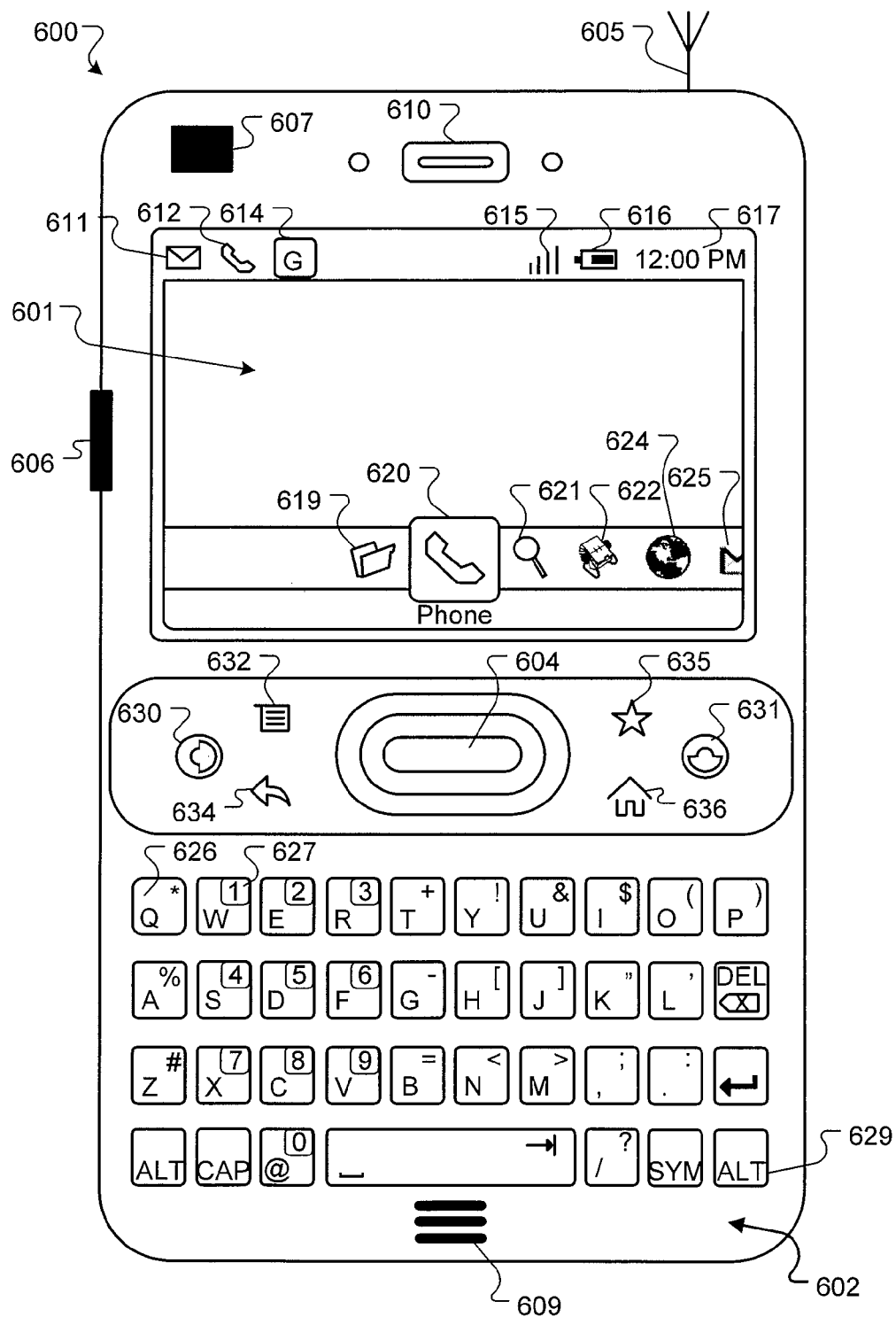
FIG. 6 is a schematic representation of an exemplary mobile device that implements embodiments of the graphics management system described herein.

Referring now to FIG. 6, the exterior appearance of an exemplary device 600 that implements the graphics management system is illustrated. Briefly, and among other things, the device 600 includes a processor configured to generate graphics on a display of a mobile device upon request of a user operating an application on the device.

In more detail, the hardware environment of the device 600 includes a display 601 for displaying text, images, and video to a user; a keyboard 602 for entering text data and user commands into the device 600; a pointing device 604 for pointing, selecting, and adjusting objects displayed on the display 601; an antenna 605; a network connection 606; a camera 607; a microphone 609; and a speaker 610. Although the device 600 shows an external antenna 605, the device 600 can include an internal antenna, which is not visible to the user.

The display 601 can display video, graphics, images, and text that make up the user interface for the software applications used by the device 600, and the operating system programs used to operate the device 600. Among the possible elements that may be displayed on the display 601 are a new mail indicator 611 that alerts a user to the presence of a new message; an active call indicator 612 that indicates that a telephone call is being received, placed, or is occurring; a data standard indicator 614 that indicates the data standard currently being used by the device 600 to transmit and receive data; a signal strength indicator 615 that indicates a measurement of the strength of a signal received by via the antenna 605, such as by using signal strength bars; a battery life indicator 616 that indicates a measurement of the remaining battery life; or a clock 617 that outputs the current time.

The display 601 may also show application icons representing various applications available to the user, such as a web browser application icon 619, a phone application icon 620, a search application icon 621, a contacts application icon 622, a mapping application icon 624, an email application icon 625, or other application icons. In one example implementation, the display 601 is a quarter video graphics array (QVGA) thin film transistor (TFT) liquid crystal display (LCD), capable of 16-bit or better color.

A user uses the keyboard (or "keypad") 602 to enter commands and data to operate and control the operating system and applications that provide for graphics management. The keyboard 602 includes standard keyboard buttons or keys associated with alphanumeric characters, such as keys 626 and 627 that are associated with the alphanumeric characters "Q" and "W" when selected alone, or are associated with the characters "*" and "1" when pressed in combination with key 629. A single key may also be associated with special characters or functions, including unlabeled functions, based upon the state of the operating system or applications invoked by the operating system. For example, when an application calls for the input of a numeric character, a selection of the key 627 alone may cause a "1" to be input.

In addition to keys traditionally associated with an alphanumeric keypad, the keyboard 602 also includes other special function keys, such as an establish call key 630 that causes a received call to be answered or a new call to be originated; a terminate call key 631 that causes the termination of an active call; a drop down menu key 632 that causes a menu to appear within the display 601; a backward navigation key 634 that causes a previously accessed network address to be accessed again; a favorites key 635 that causes an active web page to be placed in a bookmarks folder of favorite sites, or causes a bookmarks folder to appear; a home page key 636 that causes an application invoked on the device 600 to navigate to a predetermined network address; or other keys that provide for multiple-way navigation, application selection, and power and volume control.

The user uses the pointing device 604 to select and adjust graphics and text objects displayed on the display 601 as part of the interaction with and control of the device 600 and the applications invoked on the device 600. The pointing device 604 is any appropriate type of pointing device, and may be a joystick, a trackball, a touch-pad, a camera, a voice input device, a touch screen device implemented in combination with the display 601, or any other input device.

The antenna 605, which can be an external antenna or an internal antenna, is a directional or omni-directional antenna used for the transmission and reception of radiofrequency (RF) signals that implement point-to-point radio communication, wireless local area network (LAN) communication, or location determination. The antenna 605 may facilitate point-to-point radio communication using the Specialized Mobile Radio (SMR), cellular, or Personal Communication Service (PCS) frequency bands, and may implement the transmission of data using any number or data standards. For example, the antenna 605 may allow data to be transmitted between the device 600 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 606 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 606 may connect to a LAN network, a corporate or government WAN network, the Internet, a telephone network, or other network. The network connection 606 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 606 and the antenna 605 are integrated into a single component.

The camera 607 allows the device 600 to capture digital images, and may be a scanner, a digital still camera, a digital video camera, other digital input device. In one example implementation, the camera 607 is a 6 mega-pixel (MP) camera that utilizes a complementary metal-oxide semiconductor (CMOS).

The microphone 609 allows the device 600 to capture sound, and may be an omni-directional microphone, a unidirectional microphone, a bi-directional microphone, a shotgun microphone, or other type of apparatus that converts sound to an electrical signal. The microphone 609 may be used to capture sound generated by a user, for example when the user is speaking to another user during a telephone call via the device 600. Conversely, the speaker 610 allows the device to convert an electrical signal into sound, such as a voice from another user generated by a telephone application program, or a ring tone generated from a ring tone application program. Furthermore, although the device 600 is illustrated in FIG. 6 as a handheld device, in further implementations the device 600 may be a laptop, a workstation, a midrange computer, a mainframe, an embedded system, telephone, desktop PC, a tablet computer, a PDA, or other type of computing device.

Figure 7:
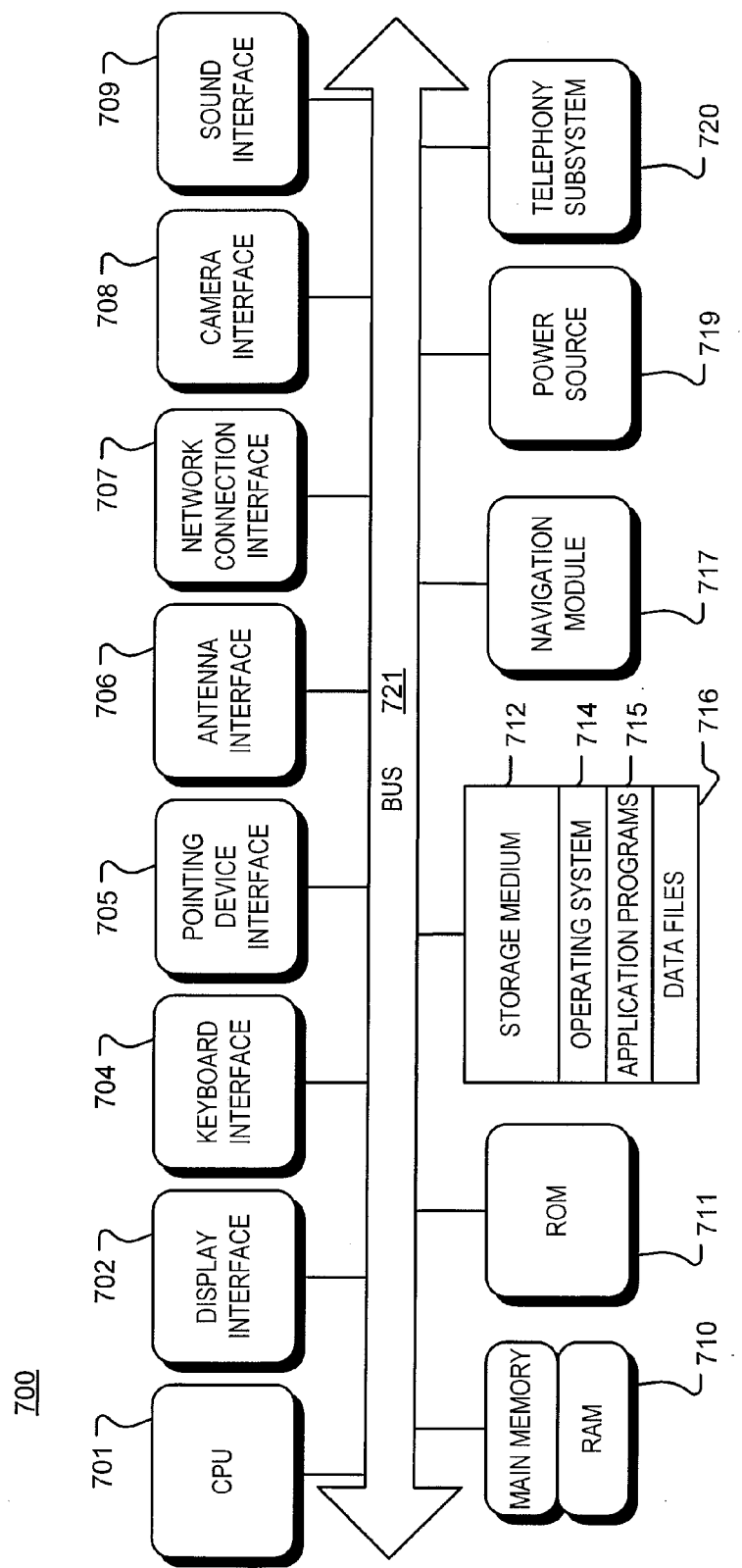
FIG. 7 is a block diagram illustrating the internal architecture of the device of FIG. 6.

FIG. 7 is a block diagram illustrating an internal architecture 700 of the device 600. The architecture includes a central processing unit (CPU) 701 where the computer instructions that comprise an operating system or an application are processed; a display interface 702 that provides a communication interface and processing functions for rendering video, graphics, images, and texts on the display 601, provides a set of built-in controls (such as buttons, text and lists), and supports diverse screen sizes; a keyboard interface 704 that provides a communication interface to the keyboard 602; a pointing device interface 705 that provides a communication interface to the pointing device 604; an antenna interface 706 that provides a communication interface to the antenna 605; a network connection interface 707 that provides a communication interface to a network over the computer network connection 606; a camera interface 708 that provides a communication interface and processing functions for capturing digital images from the camera 607; a sound interface 709 that provides a communication interface for converting sound into electrical signals using the microphone 609 and for converting electrical signals into sound using the speaker 610; a random access memory (RAM) 710 where computer instructions and data are stored in a volatile memory device for processing by the CPU 701; a read-only memory (ROM) 711 where invariant low-level systems code or data for basic system functions such as basic input and output (I/O), startup, or reception of keystrokes from the keyboard 602 are stored in a non-volatile memory device; a storage medium 712 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 714, application programs 715 (including, for example, a web browser application, a widget or gadget engine, and or other applications, as necessary) and data files 716 are stored; a navigation module 717 that provides a real-world or relative position or geographic location of the device 600; a power source 719 that provides an appropriate alternating current (AC) or direct current (DC) to power components; and a telephony subsystem 720 that allows the device 600 to transmit and receive sound over a telephone network. The constituent devices and the CPU 701 communicate with each other over a bus 721.

The display interface 702, in particular, may include a graphics processor that can run a number of processes including one or more graphics servers. The display interface 702 may include one or more particular physical processors, such as a GPU and or chip set components, or may operate with or on the CPU 701.

The CPU 701 can be one of a number of computer processors. In one arrangement, the computer CPU 701 is more than one processing unit. The RAM 710 interfaces with the computer bus 721 so as to provide quick RAM storage to the CPU 701 during the execution of software programs such as the operating system application programs, and device drivers. More specifically, the CPU 701 loads computer-executable process steps from the storage medium 712 or other media into a field of the RAM 710 in order to execute software programs. Data is stored in the RAM 710, where the data is accessed by the computer CPU 701 during execution. In one example configuration, the device 600 includes at least 128 MB of RAM, and 256 MB of flash memory.

The storage medium 712 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 600 to access computer-executable process steps, application programs and the like, stored on removable and non-removable memory media, to off-load data from the device 600, or to upload data onto the device 600.

A computer program product is tangibly embodied in storage medium 712, a machine-readable storage medium. The computer program product includes instructions that, when read by a machine, operate to cause a data processing apparatus to store image data in the mobile device. In some embodiments, the computer program product includes instructions that manage the display of graphical information in a graphical user interface (GUI).

The operating system 714 may be a LINUX-based operating system such as the ANDROID mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 714 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 714, and the application programs 715 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 715 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, the GOOGLE gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for various features using the above-described implementations, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 717 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 717 may also be used to measure angular displacement, orientation, or velocity of the device 600, such as by using one or more accelerometers.

Figure 8:
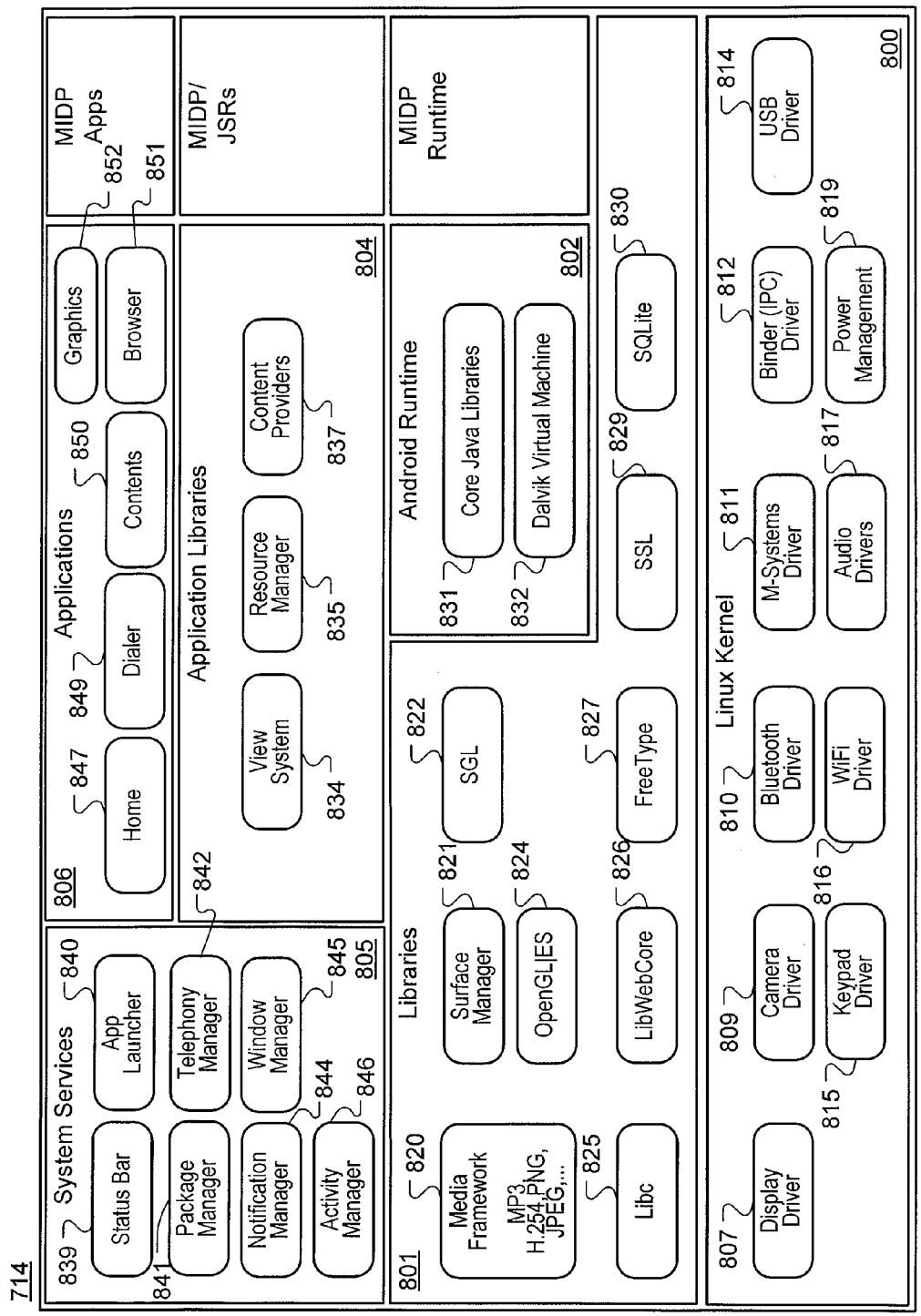
FIG. 8 is a block diagram illustrating exemplary components of the operating system used by the device of FIG. 6.

FIG. 8 is a block diagram illustrating exemplary components of the operating system 714 used by the device 600, in the case where the operating system 714 is the ANDROID mobile device platform. The operating system 714 invokes multiple processes, while ensuring that the associated phone application is responsive, and that wayward applications do not cause a fault (or "crash") of the operating system. Using task switching, the operating system 714 allows for the switching of applications while on a telephone call, without losing the state of each associated application. The operating system 714 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 714 can generally be organized into six components: a kernel 800, libraries 801, an operating system runtime 802, application libraries 804, system services 805, and applications 806. The kernel 800 includes a display driver 807 that allows software such as the operating system 714 and the application programs 715 to interact with the display 601 via the display interface 702. The display driver 807 may include features for coordinating data transfer with various applications including applications that are part of the operating system 714 and application programs 715 that run on the operating system 714.

The kernel also includes a camera driver 809 that allows the software to interact with the camera 607; a BLUETOOTH driver 810; a M-Systems driver 811; a binder (IPC) driver 812; a USB driver 814; a keypad driver 815 that allows the software to interact with the keyboard 602 via the keyboard interface 704; a WiFi driver 816; audio drivers 817 that allow the software to interact with the microphone 609 and the speaker 610 via the sound interface 709; and a power management component 819 that allows the software to interact with and manage the power source 719.

The BLUETOOTH driver 810, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver 810 provides JAVA bindings for scanning, pairing and unpairing, and service queries.

The libraries 801 include a media framework 820 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVAApplication Programming Interface (API) layer; a surface manager 821; a simple graphics library (SGL) 822 for two-dimensional application drawing; an Open Graphics Library for Embedded Systems (OpenGL ES) 824 for gaming and three-dimensional rendering; a C standard library (LIBC) 825; a LIBWEBCORE library 826; a FreeType library 827; an SSL 829; and an SQLite library 830.

The operating system runtime 802 includes core JAVA libraries 831, and a Dalvik virtual machine 832. The Dalvik virtual machine 832 is a custom, virtual machine that runs a customized file format (.DEX).

The operating system 714 can also include Mobile Information Device Profile (MIDP) components such as the MIDP JAVA Specification Requests (JSRs) components, MIDP runtime, and MIDP applications as shown in FIG. 8. The MIDP components can support MIDP applications running on the device 600.

With regard to graphics rendering, a system-wide composer manages surfaces and a frame buffer and handles window transitions, using the OpenGL ES 824 and two-dimensional hardware accelerators for its compositions.

The Dalvik virtual machine 832 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 804 include a view system 834, a resource manager 835, and content providers 837. The system services 805 includes a status bar 839; an application launcher 840; a package manager 841 that maintains information for all installed applications; a telephony manager 842 that provides an application level JAVA interface to the telephony subsystem 720; a notification manager 844 that allows all applications access to the status bar and on-screen notifications; a window manager 845 that allows multiple applications with multiple windows to share the display 601; and an activity manager 846 that runs each application in a separate process, manages an application life cycle, and maintains a cross-application history.

The applications 806 include a home application 847, a dialer application 849, a contacts application 850, a browser application 851, and graphics-generating application 852.

The telephony manager 842 provides event notifications (such as phone state, network state, Subscriber Identity Module (SIM) status, or voicemail status), allows access to state information (such as network information, SIM information, or voicemail presence), initiates calls, and queries and controls the call state. The browser application 851 renders web pages in a full, desktop-like manager, including navigation functions. Furthermore, the browser application 851 allows single column, small screen rendering, and provides for the embedding of HTML views into other applications.

Figure 9:
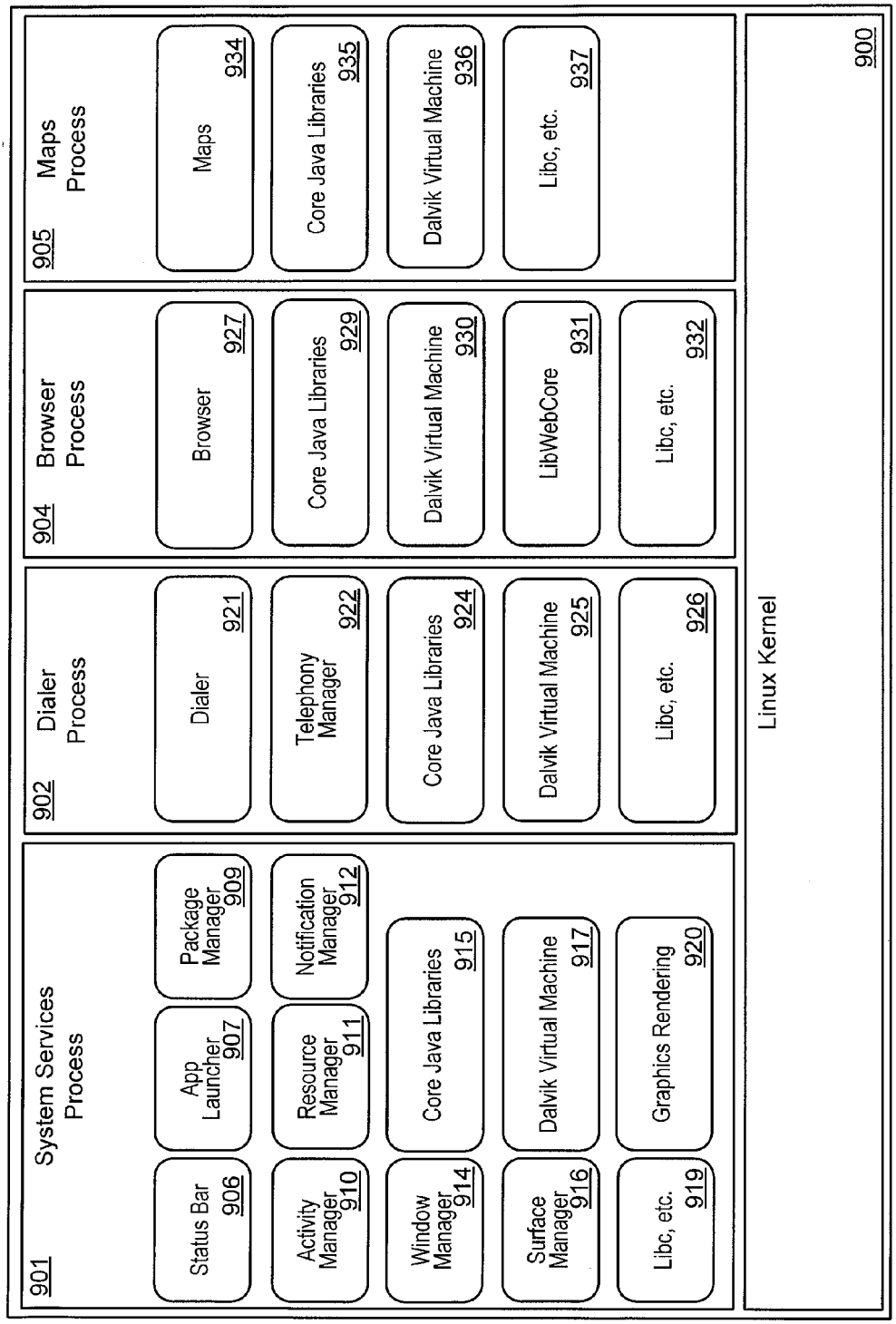
FIG. 9 is a block diagram illustrating exemplary processes implemented by the operating system kernel of FIG. 8.

FIG. 9 is a block diagram illustrating exemplary processes implemented by the operating system kernel 900. Generally, applications and system services run in separate processes, where the activity manager 846 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 916, the window manager 914, or the activity manager 910 can be continuously executed while the device 600 is powered. Additionally, some application-specific process can also be persistent. For example, processes associated with the dialer application 921, may also be persistent.

The processes implemented by the operating system kernel 900 may generally be categorized as system services processes 901, dialer processes 902, browser processes 904, and maps processes 905. The system services processes 901 include status bar processes 906 associated with the status bar 839; application launcher processes 907 associated with the application launcher 840; package manager processes 909 associated with the package manager 841; activity manager processes 910 associated with the activity manager 846; resource manager processes 911 associated with the resource manager 835 that provides access to graphics, localized strings, and XML layout descriptions; notification manger processes 912 associated with the notification manager 844; window manager processes 914 associated with the window manager 845; core JAVA libraries processes 915 associated with the core JAVA libraries 831; surface manager processes 916 associated with the surface manager 821; Dalvik virtual machine processes 917 associated with the Dalvik virtual machine 832, LIBC processes 919 associated with the LIBC library 825; and graphics handling processes 920 associated with the graphics-generating applications 852.

The dialer processes 902 include dialer application processes 921 associated with the dialer application 849; telephony manager processes 922 associated with the telephony manager 842; core JAVA libraries processes 924 associated with the core JAVA libraries 831; Dalvik virtual machine processes 925 associated with the Dalvik Virtual machine 832; and LIBC processes 926 associated with the LIBC library 825. The browser processes 904 include browser application processes 927 associated with the browser application 851; core JAVA libraries processes 929 associated with the core JAVA libraries 831; Dalvik virtual machine processes 930 associated with the Dalvik virtual machine 832; LIBWEBCORE processes 931 associated with the LIBWEBCORE library 826; and LIBC processes 932 associated with the LIBC library 825.

The maps processes 905 include maps application processes 934, core JAVA libraries processes 935, Dalvik virtual machine processes 936, and LIBC processes 937. Notably, some processes, such as the Dalvik virtual machine processes, may exist within one or more of the systems services processes 901, the dialer processes 902, the browser processes 904, and the maps processes 905.

Figure 10:
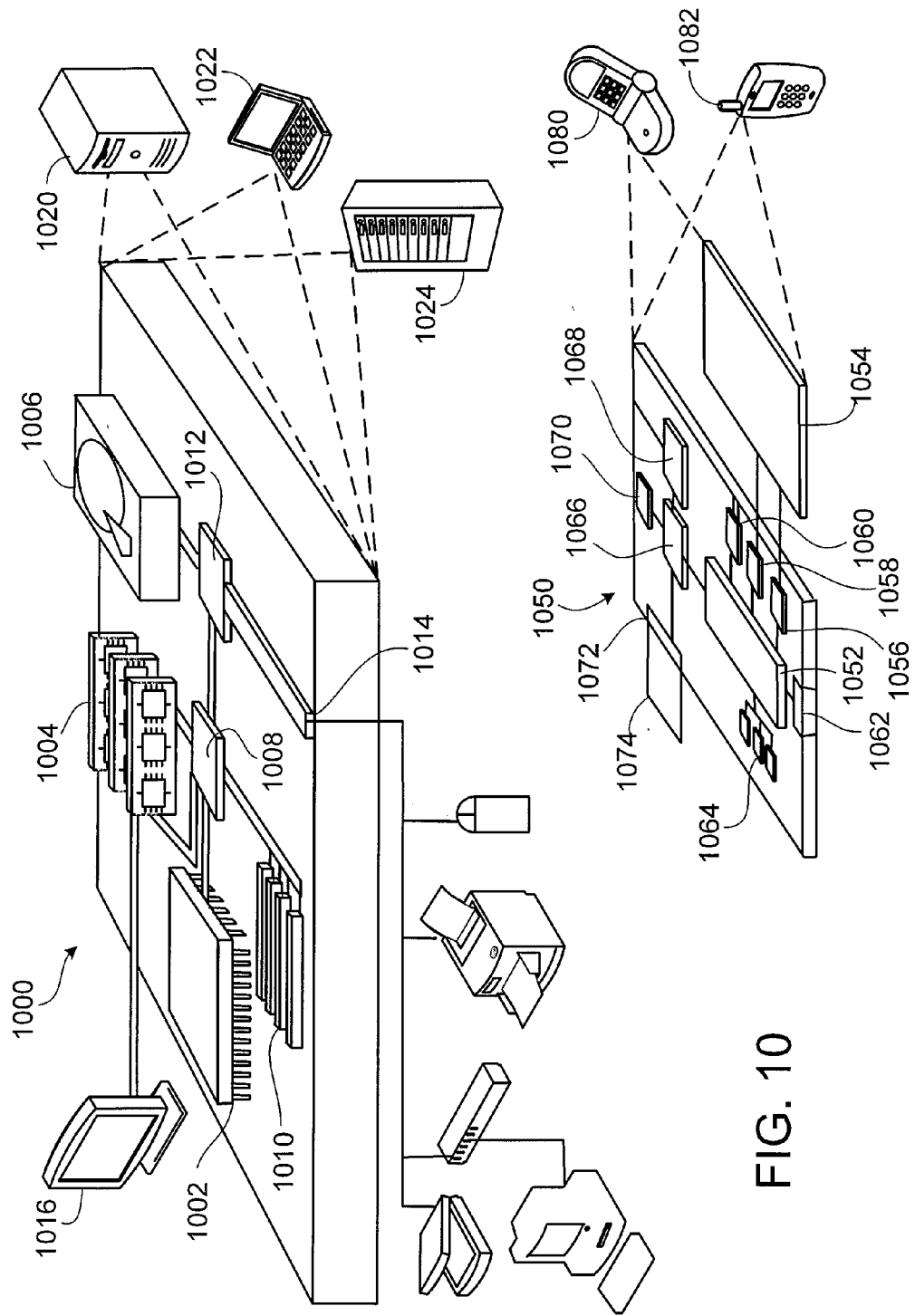
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, memory on processor 1002, or a propagated signal.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, various mechanisms may be used for making buffer status known to an server and an application providing frames to the server.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented graphics frame buffer process, comprising:
    establishing, on a computing device, a graphics frame buffer that is defined by an area of memory reserved for storing one or more frames of image data and that is accessible to be written to, but not read from, by an application process and to be read from, but not written to, by a graphics server process, and wherein the graphics frame buffer comprises a plurality of frame buffer segments;
    establishing, on the computing device, one or more frame buffer status values that are accessible to be read and written by the application process and the graphics server process, wherein the frame buffer status values represent a status of the frame buffer and are used to control access to the frame buffer, wherein the frame buffer status values comprise a plurality of single-bit flags, and wherein a first bit of the plurality of single-bit flags indicates that a frame is ready for reading by the graphics server process, and a second bit of the plurality of single-bit flags indicates a frame buffer segment from the plurality of frame buffer segments from which a next frame is to be read;
    controlling, based on the values, write access to the frame buffer by the application process and read access to the frame buffer by the graphics server process;
    generating, in response to an access to the frame buffer, a change to the; and
    reading frames from the frame buffer, by the graphics server process, wherein the values are used to control access by the graphics server process to read the frames.

2. The method of claim 1, wherein the frame buffer is protected from access by other application processes on the device.

3. The method of claim 1, wherein only the graphics server process can change the second bit.

4. The method of claim 1, wherein a third bit of the plurality of single-bit flags indicates whether all frame buffer segments have been used, and a fourth bit of the plurality of single-bit flags is a busy bit that indicates the graphics server process is reading a frame from the frame buffer.

5. The method of claim 4, further comprising setting the busy bit while the graphics server process is reading the frame, and clearing the busy bit when the graphics server process is finished reading the frame.

6. The method of claim 5, wherein the reading and writing of frames occurs without inter-process communication between the application process and the graphics server process.

7. The method of claim 1, further comprising receiving, by the graphics server process, an inter-process communication from the application process to establish the frame buffer, and returning, from the graphics server process to the application process, a handle associated with the frame buffer that has been established in response to the inter-process communication.

8. The method of claim 1, further comprising establishing a plurality of frame buffers, wherein each frame buffer is accessible by the graphics server process and only one application process on the device.

9. The method of claim 1, further comprising identifying, by the graphics server process, from an access priority list, a frame buffer, from a plurality of frame buffers, to access next.

10. The method of claim 1, wherein the frame buffer comprises a plurality of segments, and wherein the frame buffer status values indicate to the application process which segment of the plurality of segments a frame may be written to.

11. The method of claim 1, further comprising providing for display, by the graphics server process, frames from the frame buffer without further processing by the application process.

12. A tangible recordable media having recorded and stored thereon instructions, that when executed, perform actions comprising:
    establishing on a computing device a graphics frame buffer defined by an area of memory reserved for storing one or more frames of image data, accessible to be written to but not read from by an application process and to be read from but not written to by a graphics server process, wherein the graphics frame buffer comprises a plurality of frame buffer segments;
    generating frame buffer status values accessible to be read and written by the application process and the graphics server process, wherein the frame buffer status values represent a status of the frame buffer and control access to the frame buffer by the application process and the graphics server process, wherein the frame buffer status values comprise a plurality of single-bit flags, and wherein a first bit of the plurality of single-bit flags indicates that a frame is ready for reading by the graphics display process, and a second bit of the plurality of single-bit flags indicates a frame buffer segment, from the plurality of frame buffer segments, from which a next frame is to be read;
    controlling, based on the values, write access to the frame buffer by the application process and read access to the frame buffer by the graphics server process; and
    reading frames from the frame buffer, by the graphics server process, using the values to control access by the graphics server process to read the frames.

13. The tangible recordable media of claim 12, wherein the frame buffer status values includes bits indicating whether a frame is waiting to be read and which buffer, of a plurality of buffers in the frame buffer, a next frame should be written to.

14. The tangible recordable media of claim 13, wherein writing to the frame buffer and reading from the frame buffer does not use inter-process communication for synchronization.

15. A computer graphics processing system, comprising:
    a graphics processor to operate a graphics display process;
    a graphics frame buffer, defined by an area of memory reserved for storing one or more frames of image data, accessible to be written to but not read from by one or more application processes and to be read from but not written to by the graphics display process, wherein the graphics frame buffer comprises a plurality of frame buffer segments; and frame buffer status values, associated with the graphics frame buffer, the values being accessible to be read and written by the application process and the graphics display process, wherein the frame buffer status values represent a status of the frame buffer, wherein the frame buffer status values comprise a plurality of single-bit flags, wherein the frame buffer status values are used to control access to the frame buffer by the graphics display process and the one or more application processes, and wherein a first bit of the plurality of single-bit flags indicates that a frame is ready for reading by the graphics display process, and a second bit of the plurality of single-bit flags indicates a frame buffer segment, from the plurality of frame buffer segments, from which a next frame is to be read.

16. The system of claim 15, wherein the graphics frame buffer comprises a plurality of segments and the frame buffer status values indicate to the graphics display process which segment to read from.

17. The system of claim 15, further comprising a plurality of graphics frame buffers and a plurality of frame buffer status values each associated with one of the plurality of graphics frame buffers, wherein each graphics frame buffer is accessible by the graphics display process and only one of a plurality of application processes.

18. The system of claim 15, further comprising a plurality of frame buffers and a plurality of application processes, wherein each application process is associated with one frame buffer of the plurality of frame buffers.

19. The system of claim 18, further comprising an access priority list accessible by the graphics processor that indicates a frame buffer, from the plurality of frame buffers, that the graphics processor is to read from.

* * * * *

UNITED STATES PATENT AND TRADEMARK OFFICE
CERTIFICATE OF CORRECTION

PATENT NO. : 8,390,636 B1
APPLICATION NO. : 12/268192
DATED : March 5, 2013
INVENTOR(S) : Mathias Marc Agopian Page 1 of 1

It is certified that error appears in the above-identified patent and that said Letters Patent is hereby corrected as shown below:

On the Title Page:

Item 75, delete "Moutain View," and insert -- Mountain View, --, therefor.

Signed and Sealed this
Twenty-first Day of May, 2013

Teresa Stanek Rea
*Acting Director of the United States Patent and Trademark Office*